United States Patent
Tang

(10) Patent No.: US 9,897,873 B2
(45) Date of Patent: Feb. 20, 2018

(54) BLUE PHASE LIQUID CRYSTAL DISPLAY DEVICE AND DISPLAY MODULE OF THE SAME

(71) Applicant: Wuhan China Star Optoelectronics Technology Co., Ltd., Wuhan, Hubei (CN)

(72) Inventor: Yuejun Tang, Guangdong (CN)

(73) Assignee: Wuhan China Star Optoelectronics Technology Co., Ltd., Wuhan, Hubei (CN)

( * ) Notice: Subject to any disclaimer, the term of this patent is extended or adjusted under 35 U.S.C. 154(b) by 120 days.

(21) Appl. No.: 14/896,628

(22) PCT Filed: Nov. 27, 2015

(86) PCT No.: PCT/CN2015/095723
§ 371 (c)(1),
(2) Date: Dec. 7, 2015

(87) PCT Pub. No.: WO2017/084112
PCT Pub. Date: May 26, 2017

(65) Prior Publication Data
US 2017/0192282 A1    Jul. 6, 2017

(30) Foreign Application Priority Data
Nov. 19, 2015 (CN) .......................... 2015 1 0811850

(51) Int. Cl.
*G02F 1/1337*    (2006.01)
*G02F 1/1343*    (2006.01)
*G02F 1/1368*    (2006.01)

(52) U.S. Cl.
CPC ........ *G02F 1/13439* (2013.01); *G02F 1/1368* (2013.01); *G02F 1/134363* (2013.01); *G02F 2201/123* (2013.01); *G02F 2201/124* (2013.01)

(58) Field of Classification Search
CPC .......... G02F 1/13439; G02F 1/134363; G02F 1/1368; G02F 2201/124; G02F 1/1335;
(Continued)

(56) References Cited

U.S. PATENT DOCUMENTS 6,188,457 B1 *    2/2001    Liu .................... G02F 1/133753
                                                              349/124
2011/0249229 A1 *  10/2011    Kubota ............. G02F 1/133707
                                                              349/141
(Continued)

FOREIGN PATENT DOCUMENTS

JP    2008095000 A *    4/2008

*Primary Examiner* — Hoan C Nguyen
(74) *Attorney, Agent, or Firm* — Andrew C. Cheng

(57) ABSTRACT

The present invention provides a blue phase liquid crystal display device and a display module of the same. The blue phase liquid crystal display module includes: an upper substrate, a lower substrate and blue phase liquid crystals. The upper substrate having multiple upper sawtooth-shaped electrodes. The lower substrate is provided with multiple lower sawtooth-shaped electrodes which are alternately disposed with the multiple upper sawtooth-shaped electrodes. Convex portions of the multiple upper sawtooth-shaped electrodes are corresponding to concave portions of the multiple lower sawtooth-shaped electrodes. The multiple upper sawtooth-shaped electrodes are connected with a portion of the multiple upper sawtooth-shaped electrodes in order to form a first pixel electrode and a second pixel electrode which are separated from each other. Pixel electrode signals having opposite polarities are respectively applied on the first pixel electrode and the second pixel electrode.

13 Claims, 3 Drawing Sheets

(58) Field of Classification Search
CPC ............... G02F 1/13363; G02F 1/1393; G02F
1/133553; G02F 1/133528; G02F
1/133514; G02F 1/133512; G02F
1/133305; G02F 2001/133541; G02F
2001/133357; G02F 2001/133638; G02B
6/0065; G02B 6/0055
USPC .................................................. 349/106, 130
See application file for complete search history.

(56) References Cited

U.S. PATENT DOCUMENTS

2012/0293738 A1\* 11/2012 Zhao ................. G02F 1/134363
349/43
2012/0327350 A1\* 12/2012 Chang ............... G02F 1/133371
349/139
2013/0020627 A1\* 1/2013 Fukuzumi ............... H01L 21/84
257/316

\* cited by examiner

BLUE PHASE LIQUID CRYSTAL DISPLAY DEVICE AND DISPLAY MODULE OF THE SAME

BACKGROUND OF THE INVENTION

1. Field of the Invention

The present invention relates to a liquid crystal display technology field, and more particularly to a blue phase liquid crystal display device and a display module of the same.

2. Description of Related Art

Comparing to the liquid crystal material used in the conventional liquid crystal display, the blue phase liquid crystal has four outstanding advantages: (1) a response time of the blue phase liquid crystal is within submillisecond, and no over-driving technology is required to achieve a high speed driving above 240 Hz so as to reduce a dynamic fuzzy of a moving image. When utilizing a RGB-LED as a backlight source, a color filter is not required, and using the blue phase liquid crystal can achieve a color timing display; (2) The blue phase liquid crystal does not require an alignment layer required by other types of display modes so as to simplify the manufacturing cost and reducing the cost; (3) Macroscopically, the blue phase liquid crystal is optically isotropic so that a blue phase liquid crystal display device has a wide viewing angle and good in a dark status; (4) When a thickness of a blue phase liquid crystal cell is greater than a penetration depth of an electric field, the influence transmittance by a change of the blue phase liquid crystal cell can be omitted. The above property is suitable for a large screen or a single panel liquid crystal display device.

However, in the conventional art, the blue phase liquid crystal faces a problem of too large driving voltage. Currently, an improved blue phase liquid crystal material is used or optimizing a structure of an electrode. However, the improved blue phase liquid crystal material is usually a blue phase liquid crystal material having a large Kerr constant. The above method relates to a complex process of synthesis of the blue phase liquid crystal material. For example, manufacturing a stable blue phase liquid crystal material requires considering a series of factors of monomer, photo initiator, and synthesis conditions. Accordingly, the development cost is very expensive. The method of optimizing a structure of an electrode utilizes an IPS (In-plane Switching) structure for driving, a penetration depth of a lateral electric field generated by parallel electrodes is limited, which requires a higher driving voltage. Therefore, the blue phase liquid crystal display using the IPS driving method still needs to be improved.

The reason that a display panel using the blue phase liquid crystal cannot adopt a vertical electric field is: when a voltage is applied on the display panel, under the function of a vertical electric field formed between a pixel electrode on an array substrate and a common electrode on a substrate oppositely to the array substrate, the blue phase liquid crystal is stretched in a vertical direction. When a polarized light passes through the blue phase liquid crystal stretched in the vertical direction, a phase of the polarized light does not change. A polarization state of the polarized light is the same as a voltage not applying on the blue phase liquid crystal. Besides, absorption axes of polarizing films of the liquid crystal display panel are perpendicular with each other. The light emitted from the backlight source cannot pass through the liquid crystal panel so that a bright status of the liquid crystal display panel cannot be obtained. Therefore, the above vertical electric field cannot be adopted to realize a display of grayscales of the blue phase liquid crystal display panel.

SUMMARY OF THE INVENTION

The embodiment of the present invention provides a blue phase liquid crystal display device and a display module of the same in order to solve the too large driving voltage of the blue phase liquid crystal display device in the conventional art.

In order to solve the above problem, the embodiment of the present invention provides a blue phase liquid crystal display module, comprising: an upper substrate having multiple upper sawtooth-shaped electrodes; a lower substrate disposed oppositely to the upper substrate, the lower substrate is provided with multiple lower sawtooth-shaped electrodes which are alternately disposed with the multiple upper sawtooth-shaped electrodes, convex portions of the multiple upper sawtooth-shaped electrodes are corresponding to concave portions of the multiple lower sawtooth-shaped electrodes, wherein, the multiple upper sawtooth-shaped electrodes are connected with a portion of the multiple lower sawtooth-shaped electrodes in order to form a first pixel electrode and a second pixel electrode which are separated from each other, and pixel electrode signals having opposite polarities are respectively applied on the first pixel electrode and the second pixel electrode; and blue phase liquid crystals disposed between multiple the upper sawtooth-shaped electrodes and the multiple lower sawtooth-shaped electrodes, wherein an electric field is formed between the multiple upper sawtooth-shaped electrodes and the multiple lower sawtooth-shaped electrodes in order to drive the blue phase liquid crystals.

According to a preferred embodiment of the present invention, an elastic material is filled between the upper sawtooth-shaped electrodes and the upper substrate, and an elastic material is filled between the lower sawtooth-shaped electrodes and the lower substrate.

According to a preferred embodiment of the present invention, the lower sawtooth-shaped electrodes includes a first lower-sawtooth-electrode portion and a second lower-sawtooth-electrode portion which are separated from each other, the multiple upper sawtooth-shaped electrodes are connected with the first lower-sawtooth-electrode portion; the second pixel electrode includes the first lower-sawtooth-electrode portion and the multiple upper sawtooth-shaped electrodes, and the first pixel electrode is the second lower-sawtooth-electrode portion.

According to a preferred embodiment of the present invention, the second pixel electrode is connected to a second thin-film-transistor (TFT) switch, the first pixel electrode is connected to a first TFT switch, and the first TFT switch and the second TFT switch are located on a same side of the upper substrate or the lower substrate.

According to a preferred embodiment of the present invention, a partial location of the multiple upper sawtooth-shaped electrodes is provided with a sawtooth-shaped protrusion which is higher than the other upper sawtooth-shaped electrodes, or a partial location of the multiple lower sawtooth-shaped electrodes is provided with a sawtooth-shaped protrusion which is higher than the other lower sawtooth-shaped electrodes such that the multiple upper sawtooth-shaped electrodes are connected with the portion of the multiple lower sawtooth-shaped electrodes in order to form the first pixel electrode and the second pixel electrode.

According to a preferred embodiment of the present invention, the multiple upper sawtooth-shaped electrodes and/or the multiple lower sawtooth-shaped electrodes have a shifted protrusion electrode such that the multiple upper sawtooth-shaped electrodes are connected with the portion of the multiple lower sawtooth-shaped electrodes in order to form the first pixel electrode and the second pixel electrode.

According to a preferred embodiment of the present invention, the shifted protrusion electrode is located at a terminal of the multiple upper sawtooth-shaped electrodes and/or a terminal of the multiple lower sawtooth-shaped electrodes.

According to a preferred embodiment of the present invention, the first pixel electrode and the second pixel electrode are respectively connected with different thin-film-transistor (TFT) switches, the TFT switches respectively provide pixel signals having opposite polarities to the first pixel electrode and the second pixel electrode.

According to a preferred embodiment of the present invention, the TFT switches for respectively controlling the first pixel electrode and the second pixel electrode are located on a same side of the upper substrate or the lower substrate.

In order to solve above technology problem, the present invention also provides a blue phase liquid crystal display device, the blue phase liquid crystal display device includes the blue phase liquid crystal display module described in anyone of the above embodiments.

Comparing with the conventional art, in the blue phase liquid crystal display module provided by the present invention, through disposing the sawtooth-shaped electrodes filled with elastic material on the upper substrate and the lower substrate, changing the height or the location of the sawtooth-shaped protrusion electrodes on the upper substrate or the lower substrate, the upper sawtooth shaped electrodes are connected with a portion of the lower sawtooth-shaped electrodes so that the TFT circuit in the conventional art used for controlling the upper sawtooth electrodes is manufactured on the lower substrate so as to simplify the trace layout. Besides, the upper sawtooth-shaped electrodes and the lower sawtooth-shaped electrodes are applied on pixel signals having opposite polarities respectively through different TFT switches, comparing to the conventional blue phase liquid crystal electrode structure, the common electrode can be eliminated. Through changing the magnitudes of the pixel signals, decreasing the driving voltage of the blue phase liquid crystals can be achieved.

BRIEF DESCRIPTION OF THE DRAWINGS

In order to more clearly illustrate the technical solution in the present invention or in the prior art, the following will illustrate the figures used for describing the embodiments or the prior art. It is obvious that the following figures are only some embodiments of the present invention. For the person of ordinary skill in the art without creative effort, it can also obtain other figures according to these figures.

DETAILED DESCRIPTION OF THE PREFERRED EMBODIMENT

The following content combines with the drawings and the embodiment for describing the present invention in detail. It is obvious that the following embodiments are only some embodiments of the present invention. For the person of ordinary skill in the art without creative effort, the other embodiments obtained thereby are still covered by the present invention.

Figure 1:
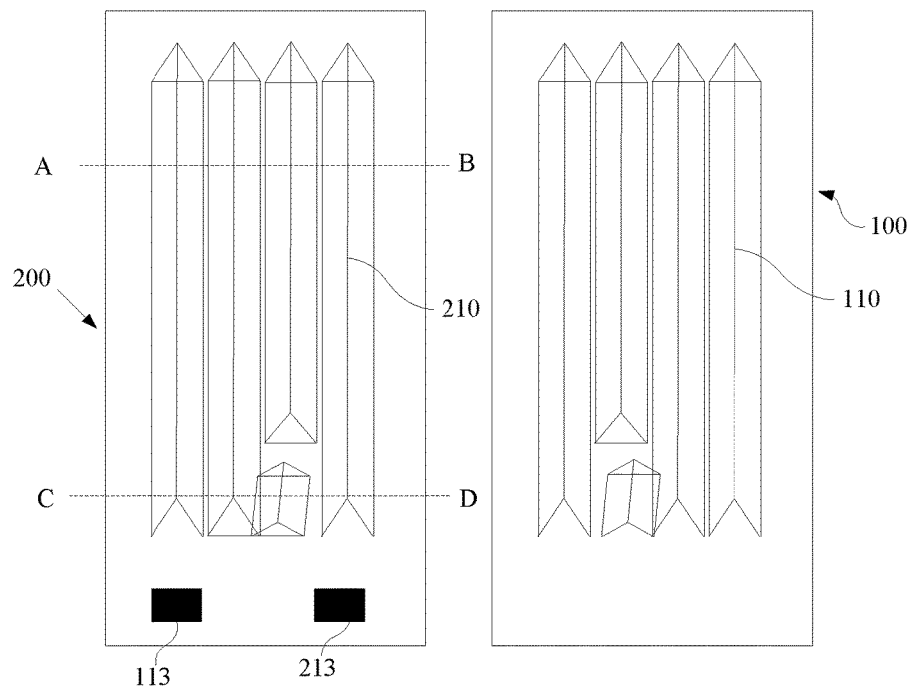
FIG. 1 is a schematic diagram of a substrate of a blue phase liquid crystal display module according to an embodiment of the present invention.
Figure 3:
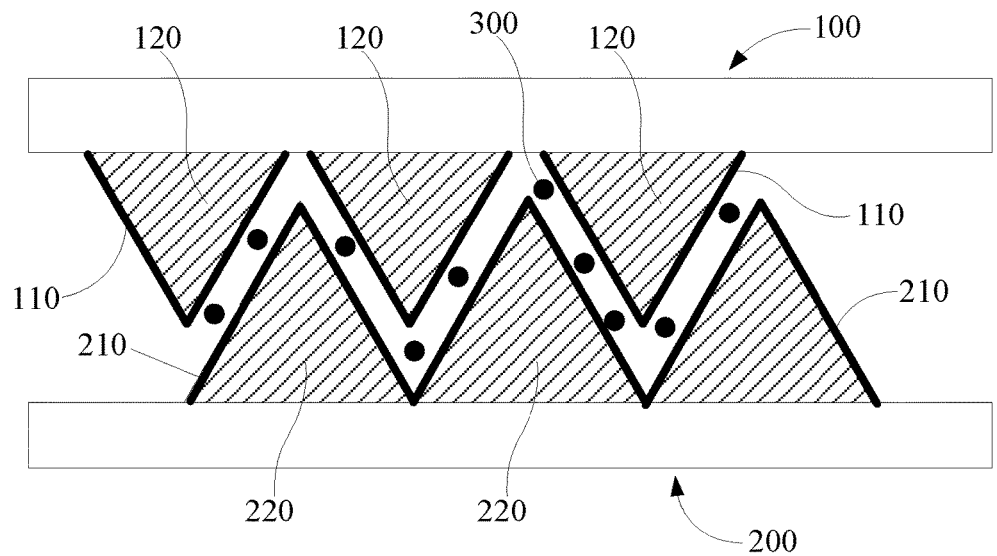
FIG. 3 is a cross-sectional view of an A-B portion of the embodiment shown in FIG. 1.

With both reference to FIG. 1 and FIG. 3, wherein, FIG. 1 is a schematic diagram of a substrate of a blue phase liquid crystal display module according to an embodiment of the present invention and FIG. 3 is a cross-sectional view of an A-B portion. The blue phase liquid crystal display module includes but not limited to following elements: an upper substrate 100, a lower substrate 200 and blue phase liquid crystals 300.

Specifically, the upper substrate 100 is provided with multiple upper sawtooth-shaped electrodes 110. An elastic material 120 is filled between the multiple upper sawtooth-shaped electrodes 110 and the upper substrate 100. The elastic material 120 is preferably an elastic transparent resin. The lower substrate 200 and the upper substrate 100 are disposed oppositely. The lower substrate 200 is provided with multiple lower sawtooth-shaped electrodes 210 which are alternately disposed with the multiple upper sawtooth-shaped electrodes 110. An elastic material 220 is also filled between the multiple lower sawtooth-shaped electrodes 210 and the lower substrate 200. The elastic material 220 is preferably an elastic transparent resin.

Convex portions of the multiple upper sawtooth-shaped electrodes 110 are sequentially corresponding to concave portions of the multiple lower sawtooth-shaped electrodes 210. That is, sawteeth of the multiple upper sawtooth-shaped electrodes 110 are alternately corresponding to sawteeth of the multiple lower sawtooth-shaped electrodes 210 one by one. The connection structure related to the upper sawtooth-shaped electrodes 110 and the lower sawtooth-shaped electrodes 210 will be described in detail following.

The blue phase liquid crystals 300 are disposed between the multiple upper sawtooth-shaped electrodes 110 and the multiple lower sawtooth-shaped electrodes 210. When a voltage is applied on the upper sawtooth-shaped electrodes 110 and the lower sawtooth-shaped electrodes 210, an electric field is formed. The blue phase liquid crystals 300 form an optical anisotropy in order to drive the blue phase liquid crystals 300.

Figure 4:
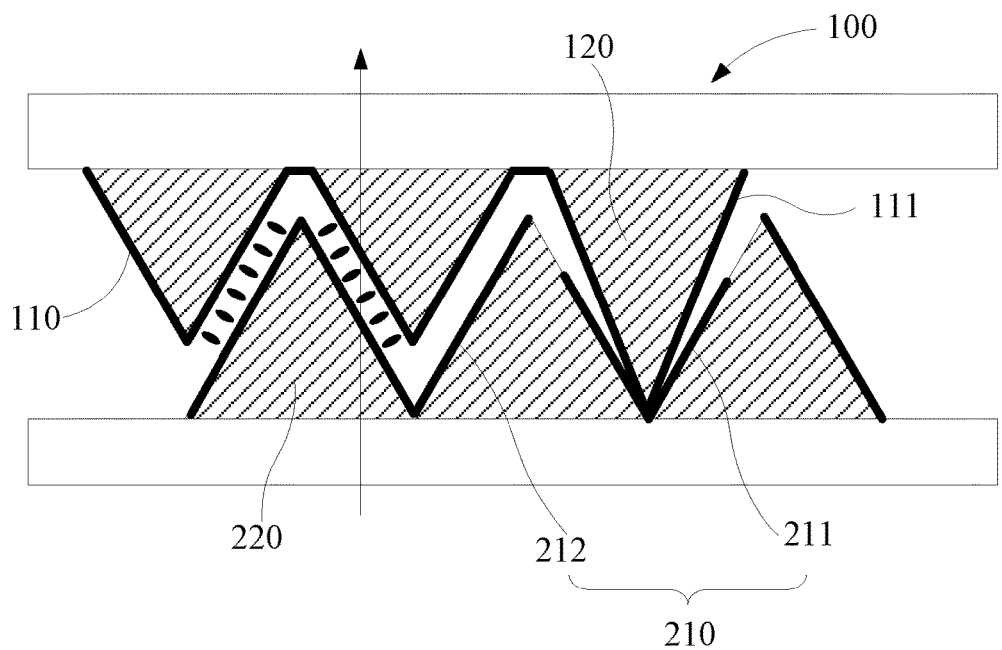
FIG. 4 is a cross-sectional view of a C-D portion of the embodiment shown in FIG. 1.

With reference to FIG. 4, and FIG. 4 is a cross-sectional view of a C-D portion of the embodiment shown in FIG. 1. In the present embodiment, the lower sawtooth-shaped electrodes 210 include a first lower-sawtooth-electrode portion 211 and a second lower-sawtooth-electrode portion 212. Wherein, on the lower substrate 200, the first lower-sawtooth-electrode portion 211 which is connected with the upper sawtooth-shaped electrodes 110 on the upper substrate 100 and the upper sawtooth-shaped electrodes 110 commonly form a second pixel electrode. The second pixel electrode is connected with a second thin-film-transistor (TFT) switch 213 and is controlled by the second TFT switch 213. On the lower substrate 200, the second lowersawtooth-electrode portion 212 which is not connected with the upper sawtooth-shaped electrodes 110 forms a first pixel electrode. The first pixel electrode is connected with a first TFT switch 113 and is controlled by the first TFT switch 113.

Specifically, a partial location of the upper sawtooth-shaped electrodes 110 is provided with a sawtooth-shaped protrusion 111 which is higher than the other upper sawtooth-shaped electrodes 110 such that the upper sawtooth-shaped electrodes 110 are connected with the first lower-sawtooth-electrode portion 211 of the lower sawtooth-shaped electrodes 210 so as to commonly form the second pixel electrode. Of course, in another embodiment, a partial location of the lower sawtooth-shaped electrodes can also be provided with a sawtooth-shaped protrusion which is higher than the other lower sawtooth-shaped electrodes so that similarly, the purpose of connecting the upper sawtooth-shaped electrodes 110 and the portion of the lower sawtooth-shaped electrodes 210 can be achieved. Preferably, the sawtooth-shaped protrusion is located at a terminal of the upper sawtooth-shaped electrodes 110 or a terminal of the lower sawtooth-shaped electrodes 210.

The above first pixel electrode and the second pixel electrode are respectively controlled by the first TFT switch 113 and the second TFT switch 213, and are applied with pixel electrode signals having opposite polarities. Within one frame, if the first pixel electrode is applied with 5V voltage, the second pixel electrode is applied with −5V voltage. In a next frame, if the first pixel electrode is applied with −5V voltage, the second pixel electrode is applied with 5V voltage. Comparing with the conventional art that applying +10V voltage or −10V voltage on the pixel electrode, and fixedly applying 0V voltage on the common electrode, each pixel electrode of the present embodiment has a smaller voltage range. For the voltage providing, an operation range and a voltage value of each pixel electrode signal is decreased.

Between the first pixel electrode and the second pixel electrode, an electric field that is perpendicular to a surface of each of the first pixel electrode and the second pixel electrode is formed. As shown in FIG. 4, the blue phase liquid crystals form an optical anisotropy when a voltage is applied. Because the electric field has a horizontal component, the optical anisotropy formed by the blue phase liquid crystals also has a horizontal component. Accordingly, after a light passes through the lower electrodes, in the blue phase liquid crystals, a phase delay of the light is generated. The light can pass through the upper electrodes in order to display brightness or darkness.

Figure 2:
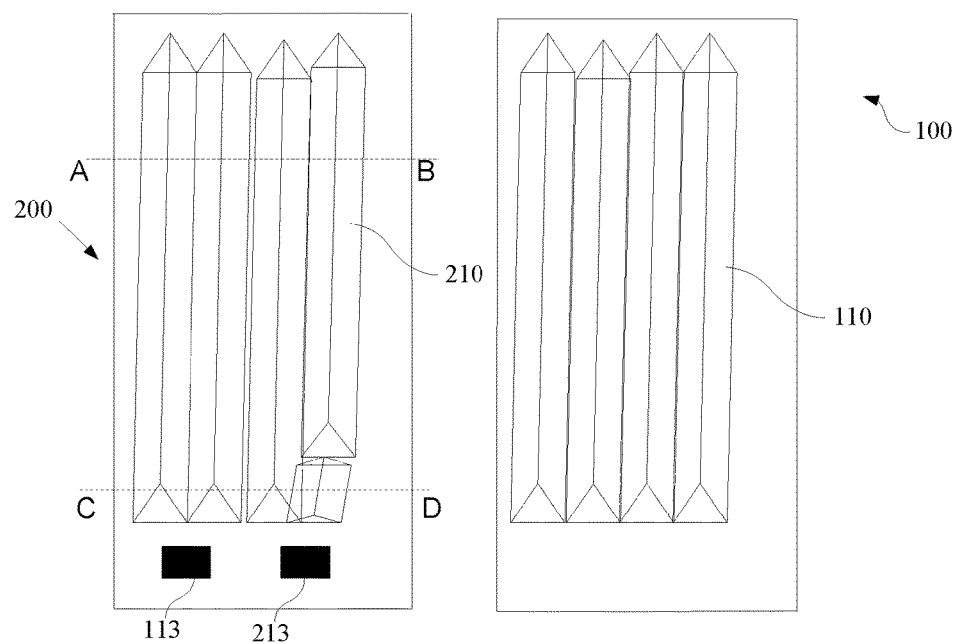
FIG. 2 is a schematic diagram of a substrate of a blue phase liquid crystal display module according to another embodiment of the present invention.
Figure 5:
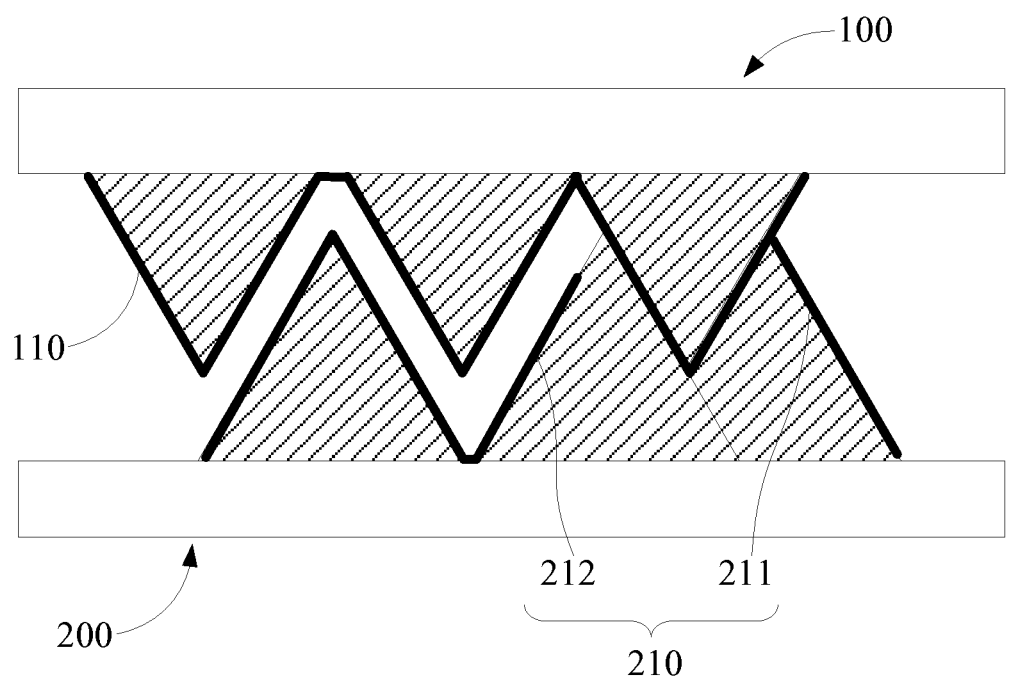
FIG. 5 is a cross-sectional view of a C-D portion of the embodiment shown in FIG. 2.

With both reference to FIG. 2 and FIG. 5, FIG. 2 is a schematic diagram of a substrate of a blue phase liquid crystal display module according to another embodiment of the present invention, and FIG. 5 is a cross-sectional view of a C-D portion of the embodiment shown in FIG. 2. In the present embodiment, the first lower-sawtooth-electrode portion 211 is shifted in order to form a shifted protrusion electrode. Specifically, an elastic protrusion below the first lower-sawtooth-electrode portion 211 is shifted to an adjacent protrusion, and connected and overlapped such that the first lower-sawtooth-electrode portion 211 covered on the elastic protrusion are also shifted correspondingly so that even heights of the upper sawtooth-shaped electrodes 110 are fixed, the upper sawtooth-shaped electrodes 110 can also be connected with the first lower-sawtooth-electrode portion 211. In the present embodiment, a shift value of the first lower-sawtooth-electrode portion 211 should make the first lower-sawtooth-electrode portion 211 to be connected with the upper sawtooth-shaped electrodes 110 corresponding to the first lower-sawtooth-electrode portion 211.

Of course, in another embodiment, the upper sawtooth-shaped electrodes 110 can also be provided with a shifted protrusion electrode or the upper sawtooth-shaped electrodes 110 and the lower sawtooth-shaped electrodes 210 are provided with shifted protrusion electrodes simultaneously. The only requirement is that the upper sawtooth-shaped electrodes 110 can be connected with the first lower-sawtooth-electrode portion 211. Preferably, the shifted protrusion electrode is located at a terminal of the upper sawtooth-shaped electrodes and/or a terminal of the lower sawtooth-shaped electrodes shown in FIG. 2.

Besides, in another embodiment, the connection structures between the upper sawtooth-shaped electrodes and the lower sawtooth-shaped electrodes are not limited to the two types of structures described above. The present invention can also connect the upper sawtooth-shaped electrodes 110 with the first lower-sawtooth-electrode portion 211 by a connection hole or a connection lead. In the field which can be understood by person skilled in the art, no more repeating here.

In the present embodiment, the first pixel electrode and the second pixel electrode are respectively connected with the different TFT switch 113 and TFT switch 213. The TFT switch 113 and the TFT switch 213 provide pixel signals having opposite polarities to the first pixel electrode and the second pixel electrode. Through dividing the lower sawtooth-shaped electrodes 210 into the first lower-sawtooth-electrode portion 211 and the second lower-sawtooth-electrode portion 212 which are separated from each other, and making the first lower-sawtooth-electrode portion 211 to be connected with the upper sawtooth-shaped electrodes 110, the TFT switches for controlling the first pixel electrode and the second pixel electrode and related traces can be disposed at a same side of the upper substrate 100 or the lower substrate 200. In the embodiments of the present invention, the TFT switches (113 and 213) and the related traces are all located on the lower substrate 200. However, the present invention is not limited.

In the present embodiment, utilizing the sawtooth electrode structures between the upper substrate and the lower substrate, the purpose of utilizing the vertical electrical field between the upper sawtooth-shaped electrodes and the lower sawtooth-shaped electrodes can be achieved so as to decrease the driving voltage of the blue phase liquid crystals. Besides, the TFT switches 113 and 213 can provide driving voltages having opposite polarities to the first pixel electrode and the second pixel electrode, and each driving voltage is one half of the magnitude of the conventional pixel signal so as to further decrease the driving voltage of the blue phase liquid crystals.

If respectively manufacturing TFT switch structures and corresponding traces on the upper substrate and the lower substrate, the manufacturing process and the driving method are complex, and the cost is increased greatly. However, through dividing the lower sawtooth-shaped electrode 210 into the first lower-sawtooth-electrode portion 211 and the second lower-sawtooth-electrode portion 212 which are separated from each other, and making the first lower-sawtooth-electrode portion 211 to be connected with the upper sawtooth-shaped electrodes 110 so that the upper sawtooth-shaped electrodes 110 on the upper substrate 100 can be controlled by the TFT switch 213 on the lower substrate 200, and through the first lower-sawtooth-electrode portion 211 to provide a pixel signal 2 to the upper sawtooth-shaped electrodes 110, wherein, the TFT switch 113 on the lower substrate 200 provide a pixel signal 1 to the second lower-sawtooth-electrode portion 212 in order to further decrease the driving voltage of the blue phase liquid crystal device.

Because the elastic materials are filled between the upper sawtooth-shaped electrodes and the upper substrate, and are filled between the lower sawtooth-shaped electrodes and the lower substrate, controlling a compression value of a contact portion (the sawtooth protrusion of the embodiment shown in FIG. 4 or the shifted protrusion electrode of the embodiment shown in FIG. 5) of the upper substrate and the lower substrate, a good conduction function between the upper sawtooth-shaped electrode 110 and the lower sawtooth-shaped electrode 210 can be realized.

Comparing with the conventional art, in the blue phase liquid crystal display module provided by the present invention, through disposing the sawtooth-shaped electrodes filled with elastic material on the upper substrate and the lower substrate, changing the height or the location of the sawtooth-shaped protrusion electrodes on the upper substrate or the lower substrate, the upper sawtooth shaped electrodes are connected with a portion of the lower sawtooth-shaped electrodes so that the TFT circuit in the conventional art used for controlling the upper sawtooth electrodes is manufactured on the lower substrate so as to simplify the trace layout. Besides, the upper sawtooth-shaped electrodes and the lower sawtooth-shaped electrodes are applied on pixel signals having opposite polarities respectively through different TFT switches, comparing to the conventional blue phase liquid crystal electrode structure, the common electrode can be eliminated. Through changing the magnitudes of the pixel signals, decreasing the driving voltage of the blue phase liquid crystals can be achieved.

Figure 6:
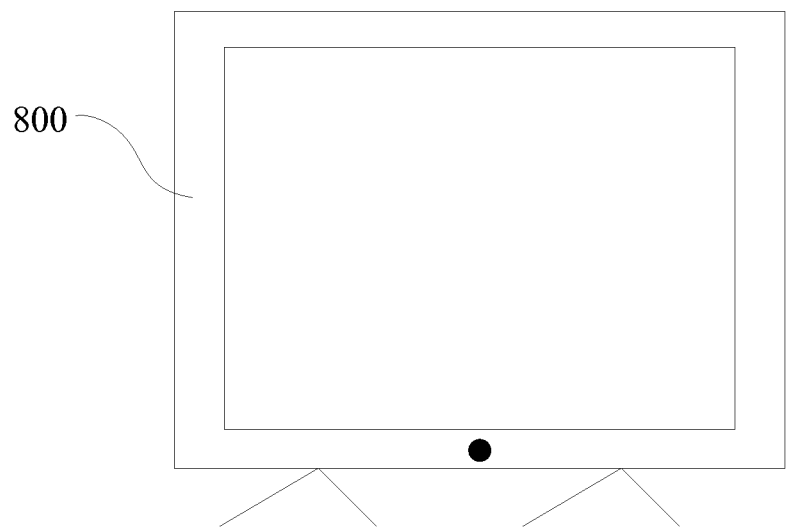
FIG. 6 is a schematic diagram of a blue phase liquid crystal display device according to an embodiment of the present invention.

Besides, the embodiment of the present invention also provides a blue phase liquid crystal display device. As shown in FIG. 6, and FIG. 6 is a schematic diagram of a blue phase liquid crystal display device according to an embodiment of the present invention. The blue phase liquid crystal display device includes one of the blue phase liquid crystal display module described in the above embodiment. The blue phase liquid crystal display device further includes related structure units such as a case 800, a control circuit (not shown in the figures), and so on. In the field which can be understood by the person skilled in the art, no more repeating here.

The above embodiments of the present invention are not used to limit the claims of this invention. Any use of the content in the specification or in the drawings of the present invention which produces equivalent structures or equivalent processes, or directly or indirectly used in other related technical fields is still covered by the claims in the present invention.

What is claimed is:

1. A blue phase liquid crystal display module, comprising:
an upper substrate having multiple upper sawtooth-shaped electrodes;
a lower substrate disposed oppositely to the upper substrate, the lower substrate is provided with multiple lower sawtooth-shaped electrodes which are alternately disposed with the multiple upper sawtooth-shaped electrodes, convex portions of the multiple upper sawtooth-shaped electrodes are corresponding to concave portions of the multiple lower sawtooth-shaped electrodes, wherein, the multiple upper sawtooth-shaped electrodes are connected with a portion of the multiple lower sawtooth-shaped electrodes in order to form a first pixel electrode and a second pixel electrode which are separated from each other, and pixel electrode signals having opposite polarities are respectively applied on the first pixel electrode and the second pixel electrode; an elastic material is filled between the upper sawtooth-shaped electrodes and the upper substrate, and an elastic material is filled between the lower sawtooth-shaped electrodes and the lower substrate; the lower sawtooth-shaped electrodes includes a first lower-sawtooth-electrode portion and a second lower-sawtooth-electrode portion which are separated from each other, the multiple upper sawtooth-shaped electrodes is connected with the first lower-sawtooth-electrode portion; the second pixel electrode includes the first lower-sawtooth-electrode portion and the multiple upper sawtooth-shaped electrodes, and the first pixel electrode is the second lower-sawtooth-electrode portion; and
blue phase liquid crystals disposed between multiple the upper sawtooth-shaped electrodes and the multiple lower sawtooth-shaped electrodes, wherein an electric field is formed between the multiple upper sawtooth-shaped electrodes and the multiple lower sawtooth-shaped electrodes in order to drive the blue phase liquid crystals.

2. A blue phase liquid crystal display module, comprising:
an upper substrate having multiple upper sawtooth-shaped electrodes;
a lower substrate disposed oppositely to the upper substrate, the lower substrate is provided with multiple lower sawtooth-shaped electrodes which are alternately disposed with the multiple upper sawtooth-shaped electrodes, convex portions of the multiple upper sawtooth-shaped electrodes are corresponding to concave portions of the multiple lower sawtooth-shaped electrodes, wherein, the multiple upper sawtooth-shaped electrodes are connected with a portion of the multiple lower sawtooth-shaped electrodes in order to form a first pixel electrode and a second pixel electrode which are separated from each other, and pixel electrode signals having opposite polarities are respectively applied on the first pixel electrode and the second pixel electrode; and
blue phase liquid crystals disposed between multiple the upper sawtooth-shaped electrodes and the multiple lower sawtooth-shaped electrodes, wherein an electric field is formed between the multiple upper sawtooth-shaped electrodes and the multiple lower sawtooth-shaped electrodes in order to drive the blue phase liquid crystals;
wherein the lower sawtooth-shaped electrodes includes a first lower-sawtooth-electrode portion and a second lower-sawtooth-electrode portion which are separated from each other, the multiple upper sawtooth-shaped electrodes are connected with the first lower-sawtooth-electrode portion; the second pixel electrode includes the first lower-sawtooth-electrode portion and the multiple upper sawtooth-shaped electrodes, and the first pixel electrode is the second lower-sawtooth-electrode portion.

3. The blue phase liquid crystal display module according to claim 2, wherein an elastic material is filled between the upper sawtooth-shaped electrodes and the upper substrate, and an elastic material is filled between the lower sawtooth-shaped electrodes and the lower substrate.

4. The blue phase liquid crystal display module according to claim 2, wherein the second pixel electrode is connected to a second thin-film-transistor (TFT) switch, the first pixel electrode is connected to a first TFT switch, and the first TFT switch and the second TFT switch are located on a same side of the upper substrate or the lower substrate.

5. The blue phase liquid crystal display module according to claim 2, wherein a partial location of the multiple upper sawtooth-shaped electrodes is provided with a sawtooth-shaped protrusion which is higher than the other upper sawtooth-shaped electrodes, or a partial location of the multiple lower sawtooth-shaped electrodes is provided with a sawtooth-shaped protrusion which is higher than the other lower sawtooth-shaped electrodes such that the multiple upper sawtooth-shaped electrodes are connected with the portion of the multiple lower sawtooth-shaped electrodes in order to form the first pixel electrode and the second pixel electrode.

6. The blue phase liquid crystal display module according to claim 2, wherein the multiple upper sawtooth-shaped electrodes and/or the multiple lower sawtooth-shaped electrodes have a shifted protrusion electrode such that the multiple upper sawtooth-shaped electrodes are connected with the portion of the multiple lower sawtooth-shaped electrodes in order to form the first pixel electrode and the second pixel electrode.

7. The blue phase liquid crystal display module according to claim 2, wherein the first pixel electrode and the second pixel electrode are respectively connected with different thin-film-transistor (TFT) switches, the TFT switches respectively provide pixel signals having opposite polarities to the first pixel electrode and the second pixel electrode.

8. A blue phase liquid crystal display device including a blue phase liquid crystal display module, and the blue phase liquid crystal display module comprises:
 an upper substrate having multiple upper sawtooth-shaped electrodes;
 a lower substrate disposed oppositely to the upper substrate, the lower substrate is provided with multiple lower sawtooth-shaped electrodes which are alternately disposed with the multiple upper sawtooth-shaped electrodes, convex portions of the multiple upper sawtooth-shaped electrodes are corresponding to concave portions of the multiple lower sawtooth-shaped electrodes, wherein, the multiple upper sawtooth-shaped electrodes are connected with a portion of the multiple lower sawtooth-shaped electrodes in order to form a first pixel electrode and a second pixel electrode which are separated from each other, and pixel electrode signals having opposite polarities are respectively applied on the first pixel electrode and the second pixel electrode; and
 blue phase liquid crystals disposed between multiple the upper sawtooth-shaped electrodes and the multiple lower sawtooth-shaped electrodes, wherein an electric field is formed between the multiple upper sawtooth-shaped electrodes and the multiple lower sawtooth-shaped electrodes in order to drive the blue phase liquid crystals;
 wherein the lower sawtooth-shaped electrodes includes a first lower-sawtooth-electrode portion and a second lower-sawtooth-electrode portion which are separated from each other, the multiple upper sawtooth-shaped electrodes are connected with the first lower-sawtooth-electrode portion; the second pixel electrode includes the first lower-sawtooth-electrode portion and the multiple upper sawtooth-shaped electrodes, and the first pixel electrode is the second lower-sawtooth-electrode portion.

9. The blue phase liquid crystal display device according to claim 8, wherein an elastic material is filled between the upper sawtooth-shaped electrodes and the upper substrate, and an elastic material is filled between the lower sawtooth-shaped electrodes and the lower substrate.

10. The blue phase liquid crystal display device according to claim 8, wherein the second pixel electrode is connected to a second thin-film-transistor (TFT) switch, the first pixel electrode is connected to a first TFT switch, and the first TFT switch and the second TFT switch are located on a same side of the upper substrate or the lower substrate.

11. The blue phase liquid crystal display device according to claim 8, wherein a partial location of the multiple upper sawtooth-shaped electrodes is provided with a sawtooth-shaped protrusion which is higher than the other upper sawtooth-shaped electrodes, or a partial location of the multiple lower sawtooth-shaped electrodes is provided with a sawtooth-shaped protrusion which is higher than the other lower sawtooth-shaped electrodes such that the multiple upper sawtooth-shaped electrodes are connected with the portion of the multiple upper sawtooth-shaped electrodes in order to form the first pixel electrode and the second pixel electrode.

12. The blue phase liquid crystal display device according to claim 8, wherein the multiple upper sawtooth-shaped electrodes and/or the multiple lower sawtooth-shaped electrodes have a shifted protrusion electrode such that the multiple upper sawtooth-shaped electrodes are connected with the portion of the multiple lower sawtooth-shaped electrodes in order to form the first pixel electrode and the second pixel electrode.

13. The blue phase liquid crystal display device according to claim 8, wherein the first pixel electrode and the second pixel electrode are respectively connected with different thin-film-transistor (TFT) switches, the TFT switches respectively provide pixel signals having opposite polarities to the first pixel electrode and the second pixel electrode.

* * * * *